F. O. RAY.
TRAP.
APPLICATION FILED APR. 9, 1915.
1,215,853.
Patented Feb. 13, 1917.
2 SHEETS—SHEET 1.
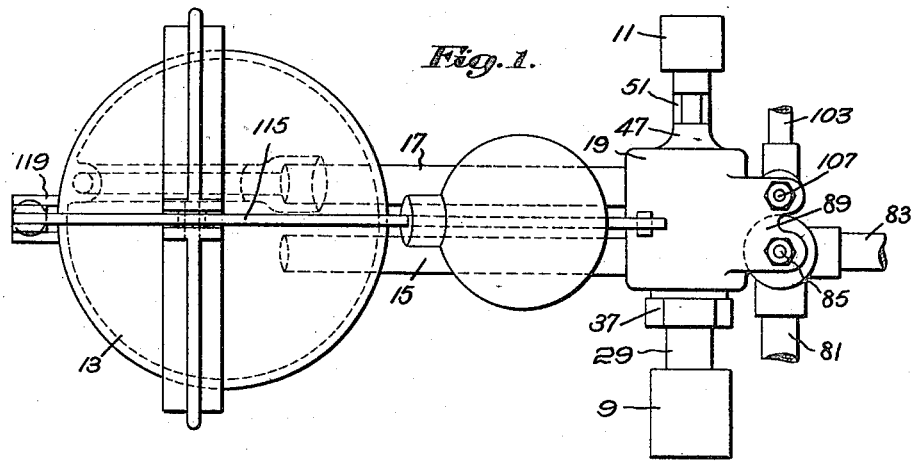
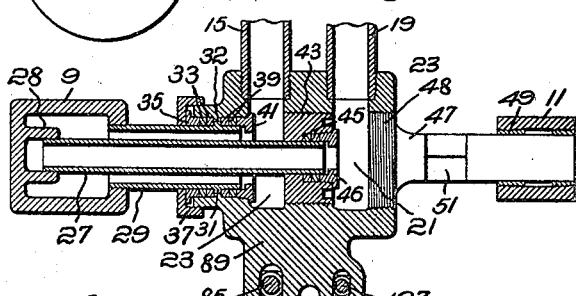
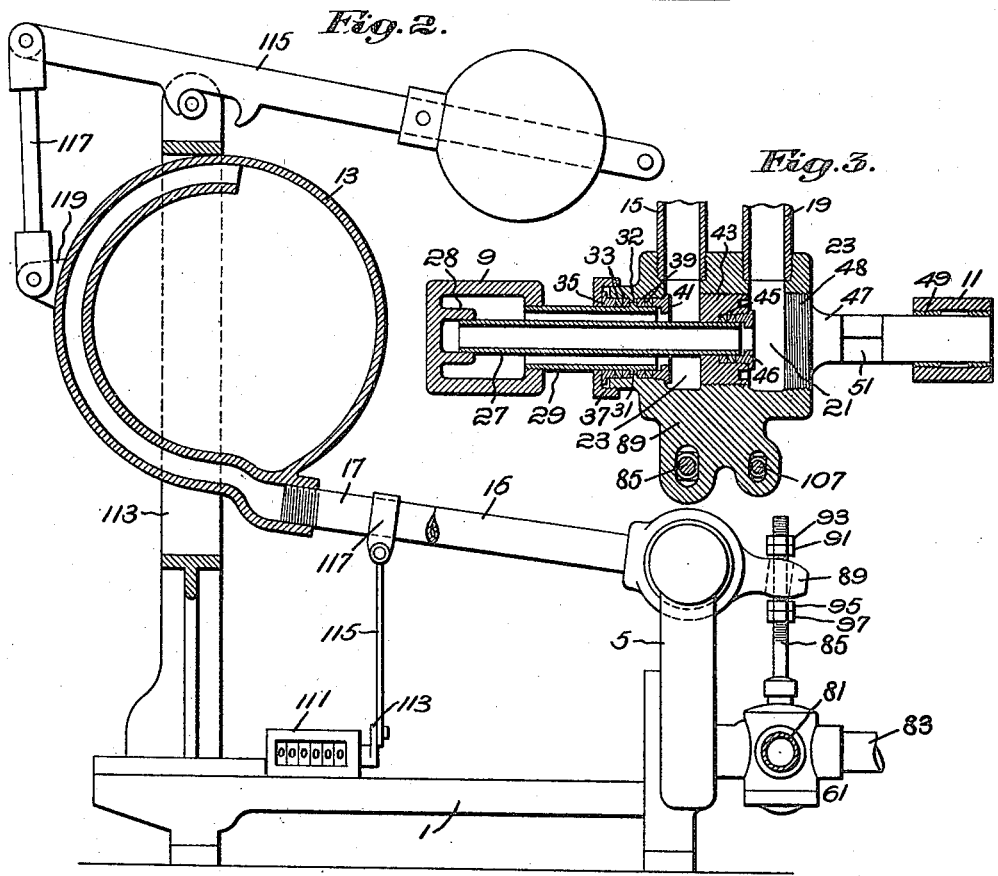
Inventor:
Frank O. Ray,
by Emery, Booth, Janney & Varney
Att'ys.

F. O. RAY.
TRAP.
APPLICATION FILED APR. 9, 1915.
1,215,853.
Patented Feb. 13, 1917.
2 SHEETS—SHEET 2.
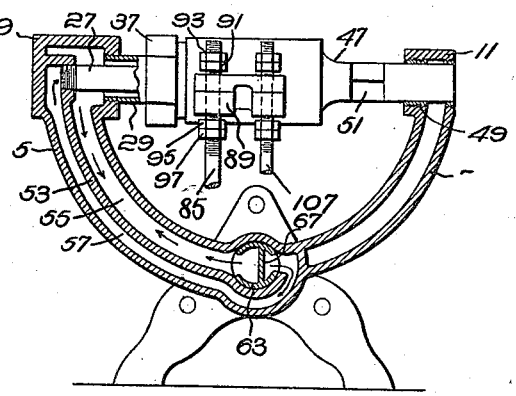
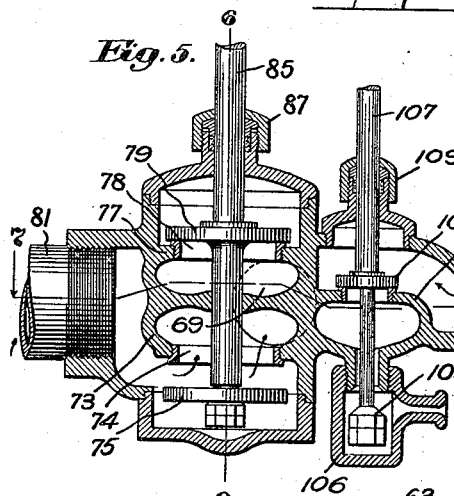
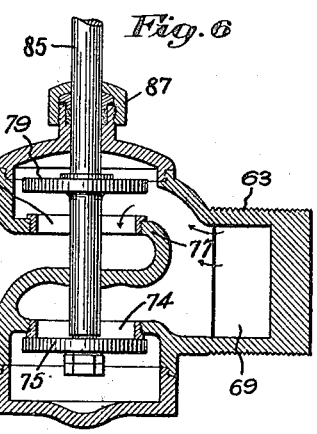
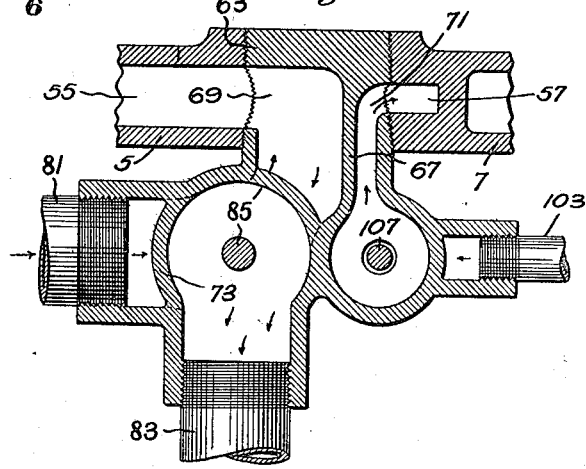
Inventor:
Frank O. Ray,
by Emery, Booth, Janney & Varney
Attys.

UNITED STATES PATENT OFFICE.

FRANK O. RAY, OF NASHUA, NEW HAMPSHIRE.

TRAP.

1,215,853.　　　　　Specification of Letters Patent.　　Patented Feb. 13, 1917.

Application filed April 9, 1915. Serial No. 20,295.

*To all whom it may concern:*

Be it known that I, FRANK O. RAY, a citizen of the United States, residing at Nashua, in the county of Hillsboro and State of New Hampshire, have invented an Improvement in Traps, of which the following description, in connection with the accompanying drawings, is a specification, like characters on the drawings representing like parts.

This invention relates to steam traps and among other objects provides a simple, compact construction whereby the water of condensation of steam may be automatically measured.

The character of the invention may be best understood by reference to the following description of an illustrative embodiment thereof shown in the accompanying drawings, wherein:—

Figure 1 is a plan of an illustrative trap shown herein as embodying the invention;

Fig. 2 is a side elevation of the trap in Fig. 1, showing parts in section;

Fig. 3, on an enlarged scale, is a sectional detail to be referred to;

Fig. 4 is a vertical section through the yoke of the support;

Fig. 5, on an enlarged scale, is a vertical section through a valve mechanism;

Fig. 6 is a section taken on the broken line 6—6 of Fig. 5; and

Fig. 7 is a horizontal section taken on the broken line 7—7 of Fig. 6.

Referring to the drawings, the illustrative trap shown herein as embodying the invention comprises a support 1 having an upwardly extending yoke 3 at one end thereof provided with arms 5 and 7 terminating in heads 9 and 11, (Fig. 4).

Mounted on this yoke is a receiver shown herein in the form of a bowl 13 (Figs. 1 and 2) for receiving water of condensation from steam. The bowl is provided with parallel tubes 15 and 17 tapped into said bowl and tapped into a coupling member 19. This member is formed to present two passages 21 and 23, the former communicating with one end of a stud pipe 27, the opposite end of which is tapped into a nipple 28 in the head of one of the yoke arms. The other passage communicates with one end of a pipe 29 substantially larger than and containing the pipe 27, the opposite end of said pipe 29 being tapped into the same head of the yoke arm as the inner pipe.

These pipes are shown herein, one concentric with the other, but obviously passages equivalent to those furnished by these pipes might be otherwise provided within the scope of the invention.

The bowl is adapted to tilt up and down about the axis of the outer and inner pipes as a fulcrum. To accomplish this the outer pipe is formed to present a flange or shoulder 31 on which is journaled an internal shoulder or flange 32 on the coupling member referred to. To prevent leakage along the joint between said shoulders, packing rings 33 of asbestos or other appropriate material are introduced against said joint so that a part of one of the packing rings engages the outer edges of the pipe and coupling shoulders. A gland 35 engages the outer packing ring and a cap 37 threaded on said coupling member is adapted to be set up to press the packing rings against the joint with the appropriate adjustment to prevent any possibility of leakage, but permit a substantially free tilting of the coupling on the pipe.

To contribute to the prevention of leakage between said outer pipe and coupling the latter is recessed adjacent the inner end of said pipe to receive packing rings 39 of asbestos or other appropriate material pressed against the inner edges of the pipe and coupling shoulders by a gland 41 threaded to said coupling.

The inner end of the inner pipe is extended beyond the outer pipe into a nut 43 threaded into a wall which separates the two passages in the coupling member. To prevent leakage between said inner pipe and nut the latter is recessed to receive packing rings 45 of asbestos or other appropriate material pressed in place by a gland 46 tapped into said nut. The packing for the inner pipe just described is contained within the coupling member and will require little or no attention after once properly adjusted.

To further contribute to the fulcrum support of the bowl, a stud shaft 47 is provided having a head 48 tapped into a bore in said coupling member in axial alinement with the inner stud pipe and the nut 43. The opposite end of said stud shaft is journaled in a bearing ring 49 of brass or other appropriate material tapped into one of the yoke arm heads. Preferably this stud shaft is made solid and is provided with a squared or slabbed off portion 51 to receive a wrench.

If it should be desired to reach the inner pipe packing described, the stud shaft head may be readily unscrewed from the coupling member thereby rendering said packing readily accessible.

If it is desired to reach the inner packing for the outer pipe the nut 43 may be removed, thereby rendering said packing readily accessible between the outer and inner pipes.

The stud shaft is free to slide axially in its bearing and therefore allows a ready expansion or contraction of the outer and inner pipes without straining the same.

The water of condensation may be conducted to and from the bowl through the annular space formed between the outer and inner pipes and the steam to force the discharge of the water of condensation from the trap may be conducted thereto through the inner pipe which also serves as a vent pipe while the bowl is filling.

The yoke arm 3 is provided with a longitudinal partition 53 (Fig. 4) dividing the same into a passage 55 communicating at its upper end with the annular space between the outer and inner papes and a smaller passage 57 communicating with the inner pipe.

At the lower end of the yoke there is provided a valve fitting 61 having a neck 63 tapped into said yoke. This neck is provided with a partition 67 (Fig. 7) which separates the same into two passages one of which communicates with the water passage 53 through a port 69 opposite said partition and the other communicates with the steam passage 55 through the port 71 opposite to said partition. The steam passage in the yoke arm 3 may be extended beyond the water passage to bring the end thereof desirably in communication with the port in said neck.

The valve fitting contains a chamber having a wall 73 (Fig. 5) having a port in which is threaded a seat 74 to receive a valve 75 for controlling the admission of water of condensation to the bowl. This chamber also has a wall 77 having a port in which is threaded a seat 78 to receive a valve 79 to control the passage of water of condensation from the bowl.

The fitting may be tapped to receive a pipe 81 for conducting the water of condensation thereto and may be tapped to receive a pipe 83 to conduct the water of condensation therefrom.

It will be noted the water admission and discharge valve ports both communicate with the same passage in the arm which leads to the bowl and they also communicate with separate pipes for conducting the water to and from the fitting.

To operate the valves they are connected to the same stem 85 projecting upward through a stuffing box 87 mounted on the top of the valve fitting. The upper end of the stem projects through an arm 89 (Fig. 4) extending from the coupling member referred to. On the stem above the arm is a nut 91 and a lock nut 93. Below said arm on said stem is a nut 95 and a lock nut 97. There should be some lost motion between the arm and the nuts to allow the bowl to obtain momentum before the arm engages said nuts to snatch the valves to and from their seats.

The valve fitting is also provided with a chamber containing a wall 99 having a port therein and formed to present a seat to receive a valve 101. The fitting is tapped to receive a pipe 103 leading to a boiler or other suitable source of steam. The lower wall of the chamber is provided with a port to receive a vent valve 105 inclosed in a housing 106.

The steam valve and vent valve are mounted on the same stem 107 which projects upward through a stuffing-box 109 in the top of the fitting. The upper end of the stem projects through the coupling arm 89 referred to, suitable nuts being provided on the stem above and beneath said arm similar to those just described.

To govern the bowl the support is provided with a ring standard 113 (Fig. 2) encircling the bowl and supporting a weighted lever 115 having at one end thereof a link 117 connected to an ear 119 projecting from the bowl.

To register the amount of the water discharged a register 111 (Fig. 2) is mounted on the support and is connected by a crank 113, link 115, and stop 117 with one of the bowl tubes 15.

In operation it may be supposed the bowl is in its uptilted position. Then the water admission valve is open, the water discharge valve is closed, the steam valve is closed, and the vent valve is open. Water of condensation may then flow through the admission pipe past the inlet valve through the passage in the neck of the valve fitting, through the passage 55 in the yoke arm 3, thence through the annular space between the outer and inner pipes and through the tube 15 into the bowl.

When a predetermined weight of water has accumulated in the bowl sufficient to overcome the counterbalance weight, the bowl will tilt down, thereby shifting the valve stems upward, closing the inlet valve, opening the water discharge valve, opening the steam valve and closing the vent valve. This permits steam to rush from the pipe, past the steam valve, through the passage in the neck of the valve fitting, through the passage 55 in the yoke arm 3, and thence through the inner pipe and tube 17 to the bowl. It passes upwardly through the wall duct of the bowl and discharges from the top of the bowl down into the bowl thereby driving out the water of condensation back through the tube 15, the annular passage between the outer and inner tubes, the passage 53 in the yoke arm 3, the passage in the neck of the valve fitting past the discharge valve out through the discharge pipe.

After the bowl has been automatically emptied by the tilting thereof as described, it tilts upward and is refilled the same as before. The register is automatically advanced an increment on each discharging operation.

By my invention no check valves are necessary since all of the valves are positively operated by the movements of the bowl, consequently the inlet valve may be sharply closed as soon as the predetermined weight of water in the bowl tilts the same downward and therefore positively prevents the flowing of any water of condensation into the bowl while it is discharging. Consequently the bowl can be counted upon always to discharge the same weight of liquid in each operation.

An important utility of the apparatus is its ability to measure the quantity of the water discharged therefrom. The weight of the water discharged in one operation may be regarded as a unit, and since the register is advanced an increment in each discharging operation it may automatically register and indicate the total amount discharged. If, for example, the weight discharged in each operation is five pounds, the increment advance for the register would be five pounds and therefore it would automatically add and register the total number of pounds discharged.

Since the water is discharged under pressure it may be returned to the boiler which generated the steam from which the water of condensation came. Thus the amount of water returned to the boiler can be readily known and be of great value in determining the cost of steam consumption.

The steam admitted into the bowl provides a forced discharge of the water therefrom and enables the elevating of the water of condensation to any height desired. The pressure back of the water of condensation may be varied as desired and the pressure of the steam used in the discharge may be varied as desired. The trap is calibrated for the highest pressures which it would experience in use, and will always tilt to discharge on the accumulation of the predetermined weight of water therein. It will be observed by the positively operated valves, there is provided a trap which may be regarded as a universal one since it is adapted to any field of use regardless of pressure conditions.

The water inlet, water discharge, steam and vent valves as shown herein, are all located in the same valve body or fitting with the water admission and discharge valves arranged in tandem on one stem, and the steam and vent valves arranged in tandem on another stem. The stems are closely adjacent to one another and extend upward but slight distances where they are connected to short arms on the coupling member. These arms are so short as compared to the long arm furnished by the tubes connected to the bowl, that a very slight movement of the latter produces a pronounced movement of the valves.

Having described one illustrative embodiment of the invention without limiting the same thereto, what I claim as new and desire to secure by Letters Patent, is:—

1. The combination with a support, of a receiver mounted thereon, an admission valve, a steam valve, a vent valve, a fitting containing all of said valves, and means for automatically operating said valves on movement of said receiver.

2. The combination with a receiver 13, of a support 5 therefor having a water admission duct 55 communicating with said receiver, a steam admission duct 57 separate from said water admission duct communicating with said receiver, a water admission valve for one of said ducts, a steam admission valve for the other duct, a fitting containing both of said valves, and means for automatically operating said valves on movement of said receiver.

3. The combination with a support, of a receiver mounted thereon, a water admission valve, a vent valve, a fitting containing both of said valves, and means for automatically operating said valves on movement of said receiver.

4. The combination with a support of a receiver mounted thereon, a water admission valve, a water discharge valve, a steam admission valve, a fitting containing all of said valves, and means for automatically operating said valves on movement of said receiver.

5. The combination with a support, of a receiver mounted thereon, a water admission valve, a discharge valve, a vent valve, a fitting containing all of said valves, and means for automatically operating said valves on movement of said receiver.

6. The combination with a receiver of a support therefor having an arm provided with water and steam passages therein, valves for said passages, and means for automatically operating said valves on movement of said receiver.

7. The combination with a receiver of a support therefor having an arm provided with passages for conducting fluid to and from said receiver, valves for said passages, a fitting containing said valves, and means for automatically operating said valves on movement of said receiver.

8. The combination with a receiver of a support therefor having an arm provided with passages and outer and inner pipes for conducting fluid to and from said receiver, valves coöperating with said passages, and means for automatically operating said valves on movement of said receiver.

9. The combination with a receiver of a support 1 therefor, admission and discharge valves 75 and 79 arranged in tandem, steam and vent valves 101 and 105 arranged in tandem, a fitting 61 containing all of said valves and means for automatically operating said valves on movement of said receiver.

10. The combination with a receiver of a support therefor having an arm provided with passages and a valve fitting connected to said support having a wall cutting off communication between said passages.

11. The combination with a receiver of a support therefor having an arm provided with passages, valves for said passages, and a fitting containing said valves having a neck connected to said support and having ports communicating with said passages.

12. The combination with a receiver of a support therefor having passages therein and a bore extending transversely to said passages, valves for said passages, and a fitting containing said valves having a neck fitting said bore provided with ports communicating with said passages.

13. The combination of a support with a receiver mounted thereon, an admission valve, a discharge valve, a steam valve, a vent valve, a fitting containing all of said valves, and means connecting said valves with said receiver for automatically operating the former on movement of the latter.

14. The combination of a support with a receiver mounted thereon, admission and discharge valve means, a stem connected thereto, steam and vent valve means, a stem connected thereto, a casing containing said valves, and means connecting said stems with said receiver for automatically operating the same on movements of said receiver.

15. The combination with a receiver, of a support therefor having an arm provided with a passage for conducting water to and from said receiver and a passage for conducting steam to said receiver, valve means for controlling the admission of water to and the discharge of water from one of said passages and the admission of steam to said other passage, and means connecting said valve means with said receiver for operating the former by movement of the latter.

16. The combination of a support having an arm provided with water and steam passages therein, a pair of pipes connected to said arm, one communicating with said water passage, and the other communicating with said steam passage, a receiver mounted to tilt about said pipes, inlet and outlet valves for controlling the admission of water to and discharge of water from said water passage, and a steam valve for controlling the admission of steam to said steam passage.

17. The combination of a support having an arm provided with water and steam passages, an outer pipe, a pipe therein spaced therefrom, said pipes being connected to said arm to communicate with said passages, a receiver mounted to tilt about said pipes, and valve means coöperating with said passages.

18. The combination of a support having arms, a receiver, a member connected to said receiver, a stud shaft fast on said member journaled in one of said arms, a stud shaft fast on said other arm serving as a bearing for said member, and having water and steam passages therein, a partition in one of the arms of said support forming passages communicating with said stud shaft passages, and valve means coöperating with said passages.

19. The combination of a support having a blind arm and an arm formed to present water and steam passages, a receiver mounted on said yoke, a stud shaft secured to said support having passages communicating with said water and steam passages, a coupling member connected to said receiver journaled on said stud shaft, and packing means for preventing leakage between said member and shaft.

20. The combination of a support having a blind arm and an arm formed to present water and steam passages, a receiver mounted on said support, a stud shaft secured to said support having passages communicating with said water and steam passages, a coupling member connected to said receiver journaled on said stud shaft, packing means for preventing leakage between said member and shaft, and valve means connected to said support for controlling said water and steam passages.

21. The combination of a support having water and steam passages in an arm thereof, outer and inner pipes secured to said support and presenting passages communicating with said water and steam passages, a receiver, a coupling member connected thereto, journaled on said pipes, and packing devices located externally and internally of said outer pipe for preventing leakage between the latter and said coupling member.

22. The combination of a support having water and steam passages in an arm thereof, outer and inner pipes secured to said support and presenting passages communicating with said water and steam passages, a receiver, a coupling member connected thereto, journaled on said pipes, packing devices located externally and internally of said outer pipe for preventing leakage between the latter and said coupling member, and packing devices for preventing leakage between said inner pipe and said coupling member.

23. The combination of a support having water and steam conducting passages therein, a receiver mounted on said support, a valve body connected to said support and provided with passages communicating with said water and steam passages, said body presenting two chambers, an inlet valve in one of said chambers, a steam valve in the other chamber, and means for automatically operating said valves on movements of said receiver.

24. The combination with a receiver for the water of condensation of steam, of a support therefor having passages communicating with said receiver, valve means for said passages, and a fitting containing said valve means and having means cutting off communication between said passages.

In testimony whereof, I have signed my name to this specification, in the presence of two subscribing witnesses.

FRANK O. RAY.

Witnesses:
ROBERT H. KAMMLER,
HENRY T. WILLIAMS.

Copies of this patent may be obtained for five cents each, by addressing the "Commissioner of Patents, Washington, D. C."